(12) United States Patent  (10) Patent No.: US 8,104,718 B2
Shaw  (45) Date of Patent: Jan. 31, 2012

(54) INFLATABLE WING FLIGHT VEHICLE (76) Inventor: Donald Orval Shaw, El Segundo, CA (US)

( * ) Notice: Subject to any disclaimer, the term of this patent is extended or adjusted under 35 U.S.C. 154(b) by 866 days.

(21) Appl. No.: 12/157,600

(22) Filed: Jun. 11, 2008

(65) Prior Publication Data

US 2009/0108135 A1 Apr. 30, 2009

Related U.S. Application Data (60) Provisional application No. 60/934,349, filed on Jun. 12, 2007.

(51) Int. Cl.
B64D 17/80 (2006.01)
B64D 17/00 (2006.01)
B64G 1/10 (2006.01)

(52) U.S. Cl. .................. 244/139; 244/146; 244/158.5; 244/158.1

(58) Field of Classification Search .............. 244/139, 244/146, 142, 138 R, 158.4, 158.5, 158.7, 244/159.2, 173.1, 173.3, 171.3, 158.1, 158.3
See application file for complete search history.

(56) References Cited

U.S. PATENT DOCUMENTS

| 3,138,348 | A  | * | 6/1964  | Stahmer      | 244/17.15 |
| 3,547,376 | A  | * | 12/1970 | Van Alstyne  | 244/172.1 |
| 3,796,398 | A  | * | 3/1974  | Eilertson    | 244/139   |
| 4,424,945 | A  | * | 1/1984  | Dell         | 244/13    |
| 4,504,031 | A  | * | 3/1985  | Andrews      | 244/113   |
| 4,518,137 | A  | * | 5/1985  | Andrews      | 244/113   |
| 5,899,415 | A  | * | 5/1999  | Conway et al.| 244/152   |
| 6,164,595 | A  | * | 12/2000 | Williams     | 244/139   |
| 6,776,374 | B2 | * | 8/2004  | LaSee        | 244/148   |
| 6,808,144 | B1 | * | 10/2004 | Nicolai et al.| 244/139  |
| 6,837,463 | B2 | * | 1/2005  | Lynn         | 244/146   |
| 6,886,785 | B2 | * | 5/2005  | Preston      | 244/145   |
| 7,487,939 | B1 | * | 2/2009  | Christof     | 244/139   |
| 2002/0134890 | A1 | * | 9/2002 | Berzin       | 244/142   |

* cited by examiner

Primary Examiner — Tien Dinh
Assistant Examiner — Joseph W Sanderson
(74) Attorney, Agent, or Firm — Richard B. Cates (57) ABSTRACT

The invention is an aircraft having an inflatable wing connected to a base unit, with the inflatable wing inflated with a lifting gas such as helium. The inflatable wing has a series of cell structures, and may be configured with ballonets to selectively introduce and expel outside air within the inflatable wing to vary the buoyancy and/or airfoil properties of the inflatable wing. The aircraft is particularly useful at low speeds and in thin atmospheres (such as at high Earth altitudes and on Mars), and can be used for interplanetary missions to explore planetary bodies, such as moons and planets, having atmospheres.

15 Claims, 6 Drawing Sheets

INFLATABLE WING FLIGHT VEHICLE

RELATED APPLICATIONS

The present application claims priority from U.S. provisional patent application Ser. No. 60/934,349, filed on Jun. 12, 2007 and entitled "Mars Flight Vehicle," the contents of which are expressly incorporated herein in their entirety.

FIELD OF THE INVENTION

The present invention relates to a flight vehicle, and more particularly to a flight vehicle having an inflatable airfoil configured to operate in relatively low atmospheric conditions such as may be encountered on Mars, and also for potential atmospheric entry in interplanetary missions.

BACKGROUND OF THE INVENTION

Various aircraft using static lift (i.e., buoyancy) or active lift (such as that provided by airfoils) are known in the art. Lighter-than-air aircraft include balloons and airships, which use static lift for all or much of their lifting capacity. Heavier-than-air aircraft include airplanes and helicopters, both of which use active lift provided by airfoils (including rotors having lifting properties). Airfoils are configured to generate lift when air passes around the airfoil surfaces.

Another air vehicle (of sorts) is the parachute, which is used to slow the descent of (and in some cases to maneuver) a dropped object. Parachutes can have some maneuverability, but the maneuverability is generally limited.

In the 1960s, the parafoil was invented, which combined elements of both airfoils and parachutes. The parafoil is an airfoil formed from parachute-like material (e.g., nylon) configured into multiple cells that form an aerodynamic airfoil shape when inflated by oncoming airflow. U.S. Pat. No. 3,285,546 to Jalbert, which issued on Nov. 15, 1966 (the entire contents of which are hereby incorporated by reference) describes the general construction and operation of parafoils.

Parafoils are generally shapeless until inflated. Inflation occurs through ram air scoops at the leading edge of the parafoil, which channel oncoming air into the parafoil to inflate the individual cells. Inflation of the individual cells forms the desired airfoil shape. In flight, the payload of a parafoil acts as a flying pendulum, the rocking of which will generally self-correct the angle of attack of the parafoil. Parafoils generally fly straight and with a standard glide unless propulsive forces or wing warping are imparted.

Parafoils can be used with a propulsion source (such as propellers) to form a powered aircraft, and are also widely used as kites and parachutes (including spacecraft recovery). An unpowered parafoil was used as part of the recovery system of the X-38 International Space Station Emergency Crew Recovery Vehicle, the tests of which included airfoil deployment (including airfoil inflation) at an altitude of approximately 120,000 feet. At such an altitude on Earth, the air pressure is comparable to that on the surface of Mars.

Airships were developed before the advent of heavier-than-air flight, and have continued in operation to the present day. The most widely used type of airship today is the blimp, which is a non-rigid airship having a generally flexible balloon envelope filled with a lighter-than-air gas such as helium. Inside the balloon envelope are one or more ballonets that can be filled with outside air. The filling of the ballonets compresses against and displaces the helium within the balloon envelope, and as the ballonets are filled (using outside air instead of the lighter helium), the overall weight of the blimp increases. Allowing the ballonets to deflate permits the helium to expand to fill more of the envelope, thus lightening the weight of the blimp.

Blimps are generally elongated in shape and derive little or no aerodynamic lift from their overall shape, instead relying almost exclusively upon their lighter-than-air characteristics and/or propulsion systems for lift. Blimps can also have control issues when compared to airfoils.

There have been attempts to combine characteristics of airships with those of heavier-than-air ships and airfoils. For example, U.S. Pat. No. 5,005,783, which issued to James D. Taylor on Apr. 9, 1991 and is entitled "Variable Geometry Airship," describes an airplane having an inflatable blimp-like envelope that can transition from a blimp-like configuration (making the aircraft a lighter-than-air vehicle) to a wing-like configuration (making the aircraft a heavier-than-air vehicle). Other inventors have attempted to develop aircraft having more streamlined blimp envelopes.

Although the prior art includes various configurations of aircraft, including lighter-than-air and heavier-than-air vehicles, what is needed is an aircraft of relatively simple construction configured for lighter-than-air flight but which also takes advantage of aerodynamic lifting forces, and which can be applicable to interplanetary missions and other applications involving relatively low atmospheric pressures. The current invention meets this need.

SUMMARY OF THE INVENTION

The invention is an aircraft configured to operation at relatively low air pressure conditions, such as may be encountered on Mars or at high altitudes (100,000 feet) on Earth. The aircraft uses a relatively large inflatable wing configured to provide both static lift (using buoyancy) and active lift (using an airfoil shape). The inflatable airfoil provides improved lift characteristics over airships or airfoils alone, and can operate in relatively thin atmospheres and even be used for atmospheric entry.

The inflatable wing of the invention has a shape somewhat similar to existing parafoils, but instead of having openings in the front of the wing (as is the case for a parafoil), the current invention wing is sealed. The inflatable wing may also have a different cross-sectional airfoil shape to take better advantage of the lighter-than-air lifting capabilities of the lifting gas (such as helium) therein. Inner bags/ballonets can be provided to regulate static lift by increasing or decreasing the amount of atmospheric air within (and therefore the buoyancy of) the inflatable wing. By decreasing wing buoyancy, the wing's ability to maneuver (including ability to handle winds and other atmospheric conditions) can be improved.

The ballonet or ballonets of the inflatable wing can be inflated using outside air, which can be provided by air scoops similar to those used on existing blimps. The air scoops can be forward facing with respect to the aircraft direction of movement, and may be positioned downstream of propellers or other propulsion devices in order to take advantage of the increased airflow/air pressure provided by the propellers.

The inflatable wing can be used in various applications, including high altitude missions in Earth's atmosphere as well as interplanetary missions, and particularly for missions to planetary bodies, such as moons and planets, having atmospheres. In one embodiment, an aircraft comprising an inflatable airfoil and a base vehicle according to the invention is configured for use on Mars. The aircraft can be delivered to Mars using known interplanetary techniques, with the inflatable wing inflated when the aircraft reaches Mars. The wing can be inflated with helium, with outside air (from the Martian atmosphere) introduced via scoops and ballonets to vary the buoyancy as desired. The vehicle could fly at various altitudes in the Martian atmosphere, and could potentially take off from and land on the Martian surface. The vehicle's ability to take off and land, as well as atmospheric abilities, would depend on the buoyancy of the airfoil, as well as the active lift provided by the airfoil shape when driven through the atmosphere by its propulsion system. Such a vehicle could fly over the Martian surface for months or even years, making landings and/or dropping payloads at various locations on the Martian surface.

The base vehicle can include solar panels (which may be able to rotate to maximize solar collection) and/or other power sources (such as nuclear power), batteries (such as lithium batteries), scientific payloads, communication systems, propulsion devices (e.g., propellers and motors), wheels (for transport on the Martian surface), a helium source (e.g., helium canisters), etc. When the helium is diminished, the base vehicle could separate from the inflatable airfoil and proceed to drive across the Martian surface or, if all propulsion abilities are gone, simply act as a ground station.

One particular embodiment of such an air vehicle includes an airfoil and a base vehicle, with the airfoil secured to and lifting the base vehicle. The base vehicle can include propellers or other air propulsion devices to drive the air vehicle through the air. The base vehicle may include wheels, with propulsion provided by the propellers or other air propulsion device, or with power provided directly to the wheels via a motor and/or gears, etc. In one embodiment, the base vehicle includes solar panels, with the propellers positioned toward the front of the base vehicle so as to blow dust off of the solar panels while providing propulsion to the air vehicle. The solar panels may be configured to vary in angle to improve the amount of sunlight received, and/or to improve the ability of the propellers to blow dust off of the panels. The propellers or other air propulsion devices may also be used to drive the base vehicle across the Martian surface when the vehicle is on the ground.

The airfoil could include ram air inlets at the leading edge, with the ram air inlets configured to be opened to permit outside air to enter into sealed internal ballonets and/or into the main airfoil envelope itself. The ram air inlets could be selectively opened after helium or other lifting gases had caused partial deflation of the airfoil, with the open ram air inlets providing for reinflation of the airfoil. Such reinflation using outer air will inherently make the airfoil heavier and less buoyant than if the airfoil were inflated fully with helium, but the intake of outside air will restore the airfoil's aerodynamic shape so that air flight might still be possible using powered flight.

The aircraft (and more particularly the base unit) can include an anchoring drill, which may be positioned toward the front of the base unit. The anchoring drill can be driven into the ground in order to secure the air vehicle at a desired position on the ground surface (e.g., during high winds, etc.), while permitting the aircraft to rotate in a 360 degree arc about the anchoring drill in order to maintain the aircraft facing into the wind. In one such embodiment, the base unit has four wheels, one or more of the wheels configured to rotate by 90 degrees when the base unit is anchored in order to permit the base unit to roll freely about the anchoring drill. In one embodiment, the front two wheels are configured to lift up and fold away when the base unit is anchored using the anchor drill, and the rear wheels are each configured to rotate by 90 degrees in order to permit the base unit to freely rotate about the anchoring drill. The anchoring drill can also be used for scientific purposes, including drilling into the Martian surface in order to access geological samples. In one embodiment, the drill is large enough to drill relatively deep into the Martian, including to depths of about 3 meters or more.

Brushless electric propeller motors such as those used with model airplanes (albeit at a somewhat larger version than used in most model airplanes) may be used with the aircraft for propulsion. Other propulsion systems are also within the scope of the invention, including chemical, nuclear, and other power systems.

The base unit tires may be inflatable and have electric motors for ground propulsion, and may be similar to those developed by the Jet Propulsion Laboratory for a potential Martian lander known as the "big wheels" inflatable rover. These large inflatable tires, composed of so-called Vectran material, are said to be able to drive over a large portion of Mars terrain using only small amounts of power. The wheels may have various sizes, depending on the particular application. In one embodiment, the wheels have a diameter of about five (5) feet (1.5 meters).

In one method of using the aircraft, the aircraft is launched with a relatively large amount of helium in the inflatable airfoil, so that static (buoyant) lift is the primary lifting source. In this mode the device acts more like an airship than an airfoil, and can remain airborne for extended periods of time while using minimal energy, with the energy being used primarily for propulsion in order to maneuver the device to desired locations. As helium lessens (due to leaks, etc.) within the inflatable wing, the device will have to rely more heavily upon active lift from the airfoil shape and propulsion systems in order to remain airborne. If the inflatable wing loses too much helium to provide sufficient static or dynamic lift, the aircraft can be landed and the inflatable airfoil separated from the base unit, with the base unit then becoming a rover (if propulsion is still available) via, e.g., inflatable wheels, or becoming a fixed ground station.

In one embodiment, the aircraft is configured for use on Mars. The inflatable airfoil can be inflated with the aircraft inserted into Martian orbit after a ballute aerobraking procedure. The inflatable airfoil may also be used as a part of the aerobraking procedure, and could even replace the ballute for such purposes. The inflatable airfoil can also be used during atmospheric entry, and then used for powered or unpowered flight for the scientific mission. The aircraft could also be landed onto the Martian surface, with the inflatable airfoil inflated thereafter to launch the aircraft directly from the Martian surface.

The aircraft can have precision hovering abilities to provide sampling and viewing over canyons and other locations. Precision landings could also permit direct sampling of features from the surface, and lowering and/or retrieval of payloads such as sensors, remote probes, tethered and untethered robots, etc.

The flight capability, including capabilities in thin atmospheres, permit the aircraft to soar continuously over the planet's surface to collect scientific data from essentially every location on the planet while using relatively low power. The aircraft could provide close proximity observations and could soft-land and retrieve various payloads, including robotic probes, from almost any location on Mars. The aircraft could fly close to the sides of crater walls, cliffs, within canyons, etc.

When the aircraft could no longer fly (due to depletion of helium and/or fuel), the base unit could separate on the ground from the airfoil and drive away, with the base unit serving as a mobile probe on the Martina surface.

The aircraft could be used to explore Mars as well as other planets and moons having an atmosphere, such as Saturn's moon Titan.

The aircraft may also have applications for high altitude flight on Earth. Such applications might include flight to unprecedented altitudes, including flights above 100,000 feet. The aircraft may also be used for so-called HALE (high altitude, long endurance) flights, which can offer benefits as communications and sensor platforms, etc. similar to those of geostationary satellites, but at much lower cost, higher resolution, and the ability to re-land and redeploy for maintenance, payload exchange, etc. The aircraft could be used to atmospheric research, including continual monitoring and measurement of temperatures, trace gas concentrations (e.g., ozone and methane), aerosols, and pollutants (e.g., volcanic ash, diesel particulate matter, etc.)

The aircraft could be used for Earth observation, including local weather monitoring and observation over relatively wide areas. For example, an aircraft according to the invention could be used to monitor an active volcano. The aircraft could also be used for surveillance while remaining relatively invisible at high altitude, out of reach, and with a low radar cross section. Such surveillance may include border monitoring and other intelligence and defense applications.

The aircraft could provide a relatively cheap platform for data transmission, and relay, including use for cell phone, television, and internet communications, particularly in remote areas such as open-ocean and/or high latitude areas where satellite coverage is cost-prohibitive. The aircraft could also be used as a so-called "guide star" for adjusting telescopes and other systems having adaptive optics which make real-time corrections to compensate for atmospheric conditions.

Depending on the particular application, the aircraft could even be used to carry personnel for various purposes, including retrieval and exploration. For example, a 100 kg payload could be achieved on Mars, which may be sufficient to lift and transport a space-suit clad astronaut and some gear through the Martian atmosphere.

Further details of various embodiments of the inventions are set forth in greater detail below with respect to the below-referenced drawings.

DETAILED DESCRIPTION OF PREFERRED EMBODIMENTS

With reference to FIGS. 1A-1D, an air vehicle 10 according to the invention has an inflatable airfoil 12 secured to a base unit 14. The airfoil 12 has a leading edge 16, trailing edge 18, top 20, bottom 22, and sides 24. The airfoil 12 is secured to the base unit 14 via connections such as canopy lines 26 and risers 28.

Figure 3:
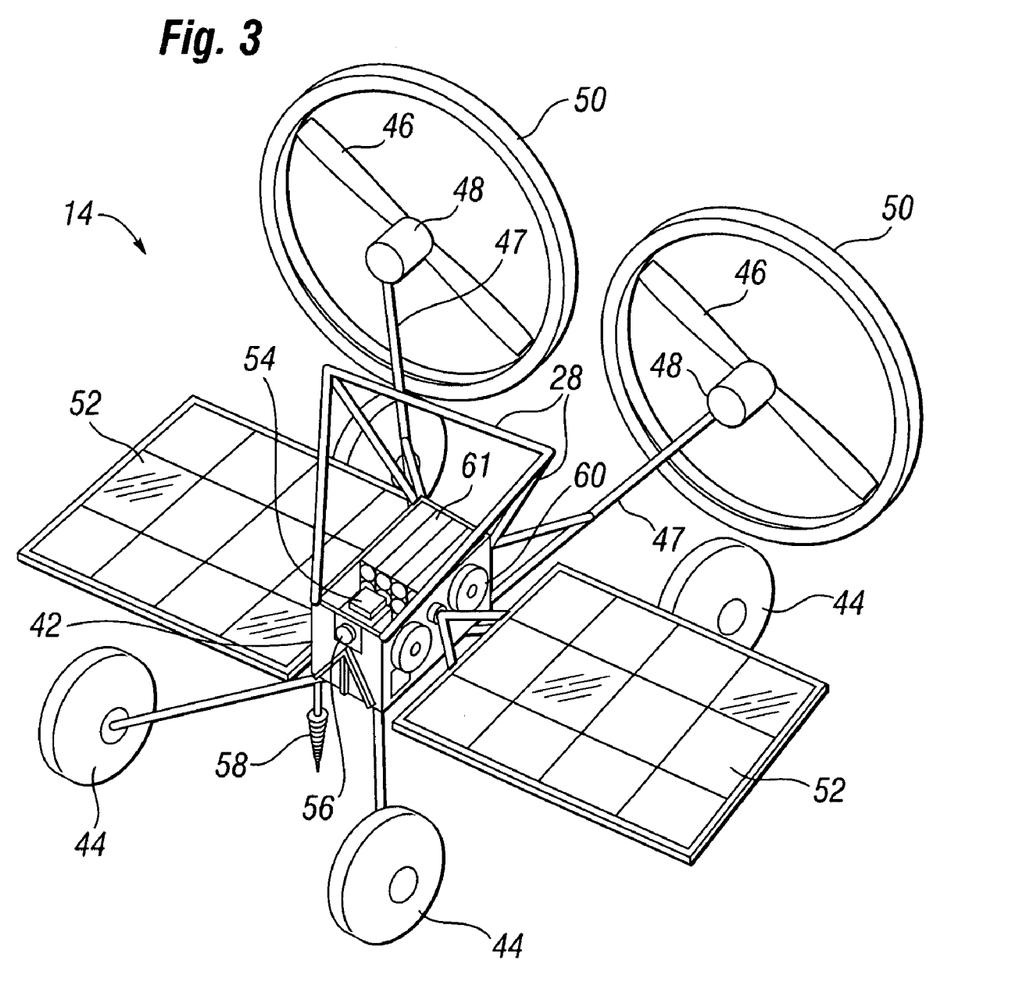
FIG. 3 depicts a perspective view of a base unit according to an embodiment of the invention.

The base unit 14, which is also depicted in FIG. 3 in greater detail, has a front 30, back 32, bottom 34, top 36, and sides 40, and includes a main body 42, wheels 44, propellers 46, motor 48, optional propeller cage or shroud 50, solar panels 52, batteries 54, scientific payloads 56, drill 58, and communication antenna 60. The wheels 44 may be inflatable wheels, which could be inflated with surrounding atmosphere, residual gases left over from the manufacturing and assembly process on Earth, and/or other gases such as the lifting gas used for the airfoil, and may be inflated prior to entering the Martian atmosphere, during atmospheric entry, or after such entry. The base unit 14 may also include one or more pumps (not shown) used to inflate tires and other inflatable structures (such as struts, propellers, etc.) and even the airfoil itself.

One or more ballonets 62 are positioned within the inflatable airfoil 12, with one or more air tubes 64 and scoops 66 leading to the ballonets 62. In the particular embodiment depicted, the scoop 66 is positioned just behind one of the propellers 46 in order to take advantage of the airflow from the propeller 46 to inflate the ballonet 62. The scoop 66 may include a valve or similar closure mechanism that can be selectively opened and closed to provide more or less air into the ballonet 62.

The aircraft 10 can be maneuvered by thrusting the left or right propellers 46, and/or by warping the airfoil 12, which can be accomplished using tether lines 49 and/or spools that can retract and/or deploy front and rear portions of the airfoil 12. The tether lines 49 may also function as canopy lines (such as the canopy lines 26). Such tether lines 49 could lead from spools or other tensioning controls on the base unit 14 to, e.g., the trailing edge 18 of the airfoil 12. For example, a wing winch control housing could be positioned toward the top of the base unit, and have separate actuators to control tension in one or more tether lines and thereby control warping of the wings. For redundancy there can also be a ballonet control and an additional wing angle of attack adjustment made via a linkage system (such as a four bar linkage system) to tilt the wing and thus change the center of gravity of the aircraft 10, thus causing the airfoil 12 to lower in front or back depending on what is desired.

Referring to FIGS. 2A-2D, an airfoil 12 according to the invention has an outer envelope 68 having a leading-edge to trailing-edge length 70, a width/wingspan 72, and a height 74. The envelope 68 is generally sealed and is configured to hold a lifting gas such as helium or hydrogen therewithin. The lifting gas inflates the airfoil 12 to a desired shape and buoyancy. The interior of the envelope 68 is divided into a plurality of longitudinally-oriented cells 76 defined by inner walls 78, with the inner walls 78 separating adjacent cells 76. In the particular embodiment depicted, the inner walls 78 have holes 80 or other openings therein to permit gas to pass freely between adjacent cells 76. In an embodiment of the invention, the inner walls 78 can be open-mesh type structures, or relatively solid (non-porous) material. The inner walls 78 give the desired shape to both the individual cells 76 and also to the overall airfoil 12 when inflated.

The particular airfoil 12 depicted also has a ballonet 62, which in the particular embodiment depicted is positioned in the centermost cell 76c. The ballonet 62 can be inflated and/or deflated with air (i.e., outside atmosphere) in order to compress the helium or other lifting gas in the envelope 68 in order to vary the weight and therefore the airfoil buoyancy (static lift). The particular ballonet 62 is configured to expand upwards within the centermost cell 76c. In other embodiments, multiple ballonets could be provided in one or more cells of an airfoil. Separate ballonets could be individually controlled in their inflation and/or deflation in order to vary airfoil buoyancy and/or shape, including variations across the width, length, and/or height of the airfoil.

In the particular embodiment depicted in FIGS. 2A-2D, the airfoil 12 has a generally curved top surface 20, generally curved sides 24, and a relatively flat bottom surface 22. Other shapes are also within the scope of the invention, such as flat or tapered sides, concave or convex bottom surface, etc. The generally flat bottom surface 22 can provide enhanced aerodynamic lift and also provide improved atmospheric entry characteristics.

The airfoil 12 may include solar panels 82 on its top 20. Such airfoil-mounted solar panels 81 would not be subject to the shading from the airfoil 12 that may occur for solar panels mounted on the base unit, such as the solar panels 52 in FIGS. 1A-1D and 3A-3B. The solar panels 82 could be formed using so-called "solar paint" and/or nanotechnology, including applications where the solar panel is formed using a thin coating of solar paint applied to the airfoil. The airfoil may also include one or more communication antennas thereon, which would also avoid the shadow from the airfoil and possibly provide superior reception and transmission over similar devices positioned on the base unit.

The airfoil 12 provides both static lift from the helium or other lifting gas therein, and also aerodynamic lift from the airflow passing over and around the airfoil 12. The static lift alone might be sufficient to keep the aircraft 10 aloft, depending on the particular aircraft, atmospheric pressure, temperature, etc.

In one embodiment of the invention, a base unit or other payload has a mass of about 525 kilograms. To lift such a mass on Earth at sea level using buoyancy alone, a helium-inflated airfoil would require a volume of about 18,500 cubic feet, which could be achieved with an airfoil having a length of about 69 feet, a width of about 46 feet, and an average height of about 16 feet. To lift a similar mass on Mars using buoyancy alone, a helium-inflated airfoil would require a much larger volume in order to account for the much lighter Martian atmosphere. More particularly, such a mass could be lifted on Mars using buoyancy alone by an airfoil having a helium volume of about 6,750,000 cubic feet, which involve a helium-inflated airfoil according to the invention having a length of about 350 feet, a width of about 235 feet, and an average height of about 80 feet.

A base unit 14 according to an embodiment of the invention is depicted in greater detail in FIG. 3. The particular base unit 14 has a main structural body 42, four wheels 44, two propellers 46, two electric motors 48, propeller cages 50 or shrouds, two solar panels 52, batteries 54, various scientific payloads 56, drill 58, and communication antenna 60. Helium tanks 61 are included to provide helium to the inflatable airfoil 12 via helium lines (not shown) extending from the base unit 14 to the airfoil 12. In one particular embodiment of the invention, the two motors 48 are thirty-three (33) horsepower brushless electric motors. The wheels 44, propellers 46, propeller shafts 47, solar panels 52, and other extending structures can be configured to fold against the base unit 14 main structural body 42 for, e.g., launch and delivery, and then to fold outward when the aircraft 10 is deployed. The propellers 46, propeller shafts 47, and other extending structures may be inflatable or otherwise expandable. The risers 28 form a generally rigid frame to which canopy lines can be secured.

Figures 1A, 1B, 1C, 1D:
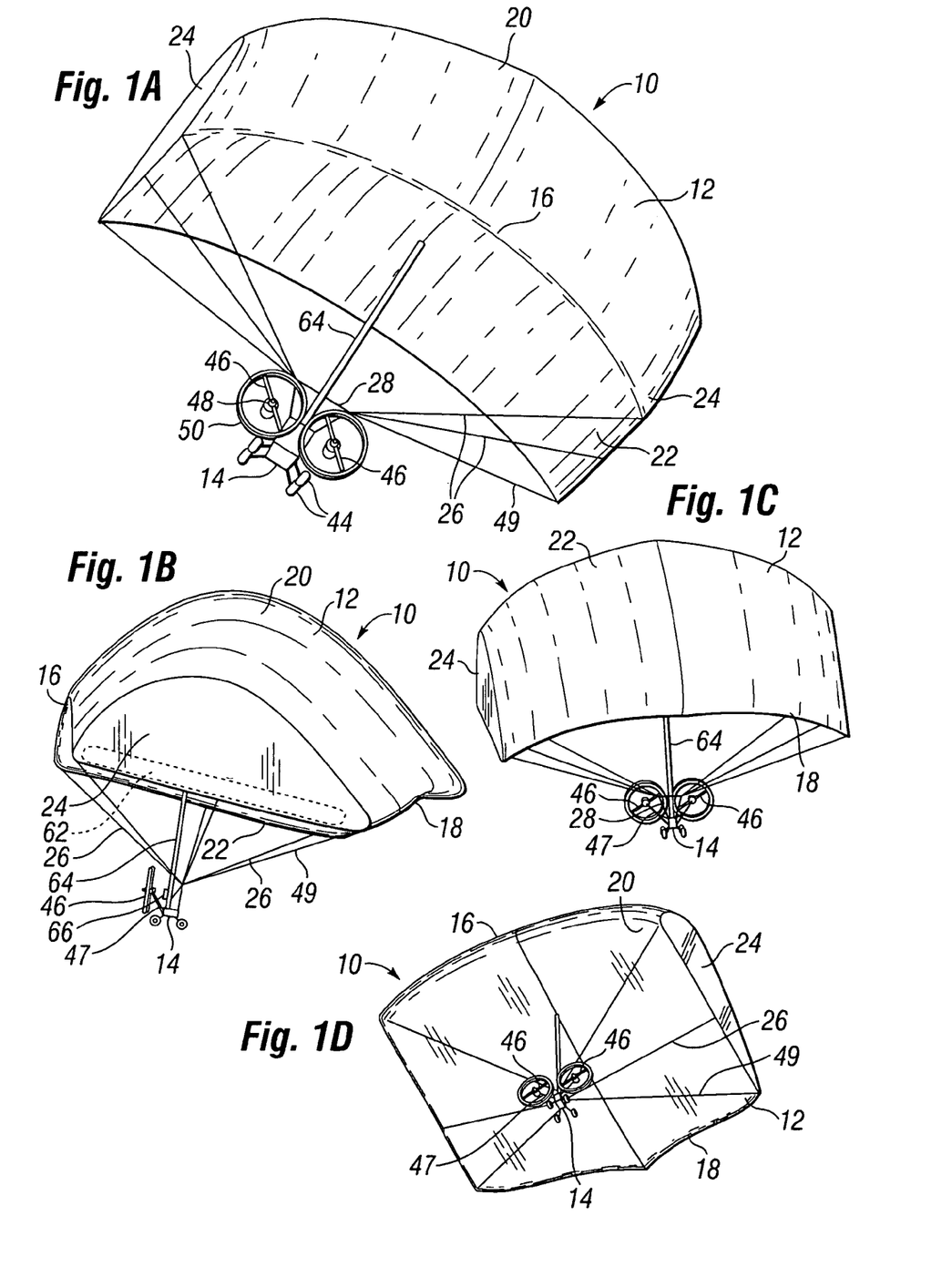
FIGS. 1A, 1B, 1C, and 1D depict front, side, rear, and bottom views, respectively, of an aircraft according to an embodiment of the invention.
Figures 2A, 2B, 2C, 2D:
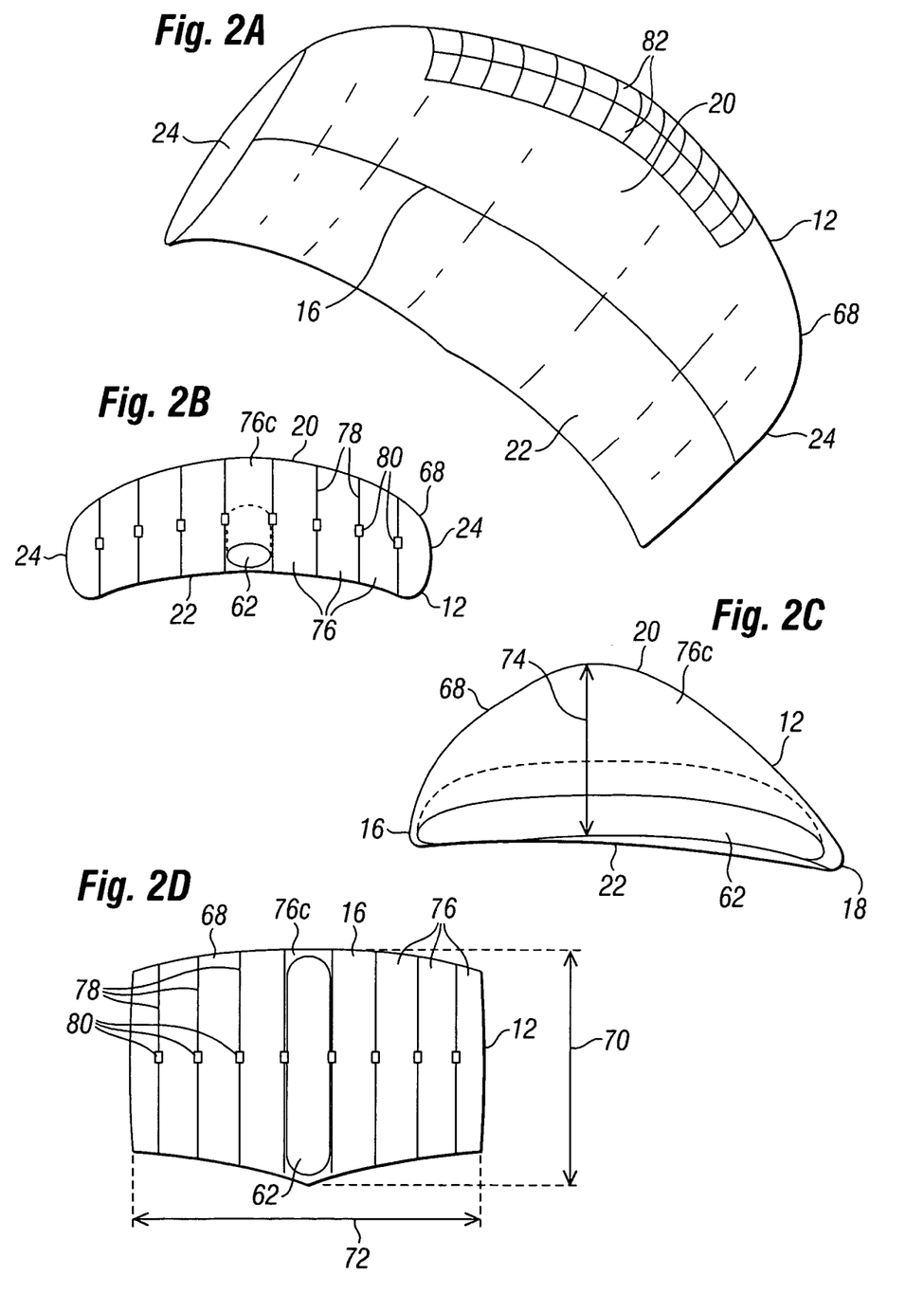
FIGS. 2A-2D depict perspective, front (cross-section), side (cross-section) and top (cross-section) views, respectively, of an inflatable airfoil according to an embodiment of the invention.

In the particular embodiment of FIG. 3, the propellers 46 are mounted at the front of the base unit 14 in order blow dust off the solar panels 52 and also blow air into ballonet air scoops such as those depicted in FIGS. 1A-1C. Note that the propellers 46 could be positioned at the back of the base unit 14 or at other locations, depending on the particular application. The propellers 46 could be formed of a foam-filled carbon structure, and/or could be an inflatable structure. The propellers 46 may be configured to fold up, such as by folding into three sections per propeller arm. The propeller shafts 47 may be spring-loaded to assist in propeller deployment. The propellers 46 may be counterrotating to each other.

The solar panels 52 may be positioned on extensions, and may also be provided with one or more motors to selectively rotate the solar panel orientation to maximize solar radiation intake. Solar panel orientation could also be used to control or otherwise impact steering and/or lift of the aircraft 10. Solar panel size depends on the particular application, with 12 square meters of solar panels in one embodiment.

One or more of the wheels 44 may include an electric motor (not shown) to rotate the wheel(s) 44 in order to drive the base unit 14 across the surface.

With judicious use of power, the aircraft 10 could remain airborne for minutes or hours or even continuously each day, depending on the particular application. In one embodiment, a one-day recharging from the solar panels 52 could permit the aircraft 10 to fly for about 15 minutes at speeds of up to 120 mph, or to fly for 24 hours at speeds of about 2 mph.

Specifications of an aircraft according to one embodiment of the invention are listed below in Table 1:

| | |
|---|---|
| Flight time per one day solar charge: | 15 minutes at full power; 24 hours (i.e., continuous) at low power |
| Total vehicle launch mass: | 4571 to 5119 kilograms |
| Airfoil weight: | 2104 kilograms (40 grams/m$^2$ average) |
| Airfoil ballistic coefficient: | 0.3 |
| Motors: | Two 15 horsepower brushless electric motors (30 hp total) |
| Maximum forward airspeed: | Over 120 mph |
| Science payload weight: | 50 to 100 kilograms |
| Propeller diameter: | 30 to 45 feet each |
| Parafoil wingspan: | 300 to 450 feet |
| Base unit weight (including helium, tanks, science payload): | 1915 kilograms |
| Drill weight (3 meter): | 30 kilograms |
| Base unit wheel-to-wheel width (with wheels extended): | 20 feet |

Figure 4A:
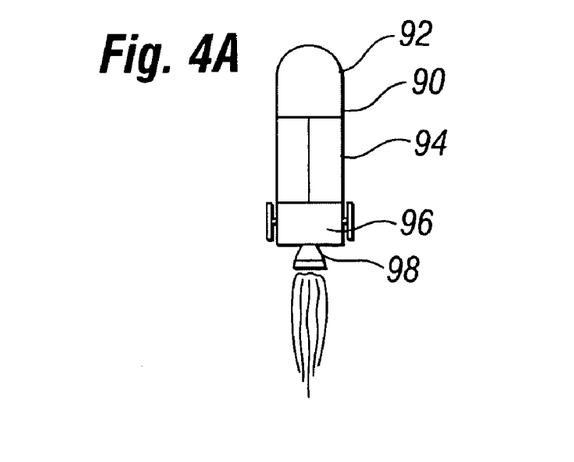
FIGS. 4A-4G depict various stages of delivering the aircraft to Mars or another location according to an embodiment of the invention.
Figure 4B:
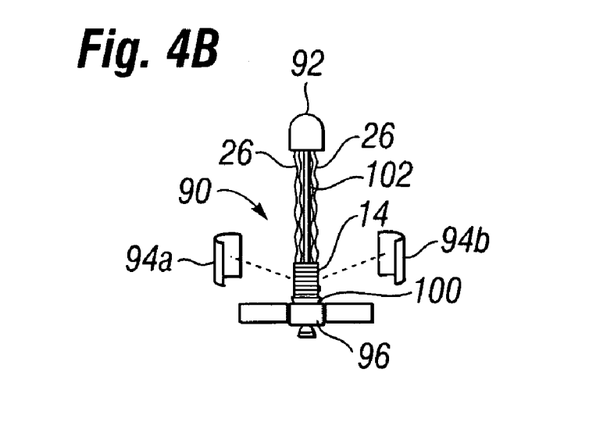

FIGS. 4A-4E depict various stages of delivery of an aircraft to Mars or another planet according to an embodiment of the invention. The aircraft is initially launched from Earth on a launch vehicle, such as a Delta IV rocket, placing the aircraft on a trajectory which intercepts Mars. The aircraft 10 may be delivered as part of a payload 90 including an airfoil cover 92, base unit cover 94, and spacecraft assembly 96 (which may include a rocket 98 configured to provide thrust for orbital insertion after the Earth-to-Mars trajectory is completed). As the payload 90 approaches Mars, the rocket 98 can fire as depicted in FIG. 4A to slow the payload speed and assist (or even achieve) orbital insertion. With the payload sufficiently slowed, the base unit cover 94 can be dropped (which is depicted as being jettisoned in two pieces 94a, 94b) as depicted in FIG. 4B, revealing the base unit 14 and heat shield 100. The airfoil cover 92 (with airfoil therein) can extend upward with the airfoil connected to the base unit 14 via a helium inflation tube 102. During fabrication/assembly of the aircraft, the helium inflation tube 102 can be wrapped or otherwise surrounded by the canopy lines 26 or other structure that will support the base unit 14 underneath the airfoil after deployment. The canopy lines 26 could pressed against or even be lightly glued to the helium inflation tube 102, such as with pressure-sensitive adhesive, which will permit them to easily pulled away from the helium inflation tube during airfoil deployment.

Figure 4C:
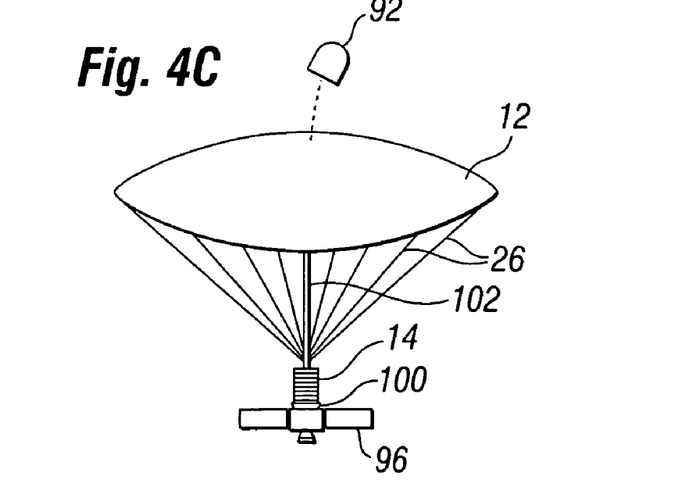
Figure 4D:
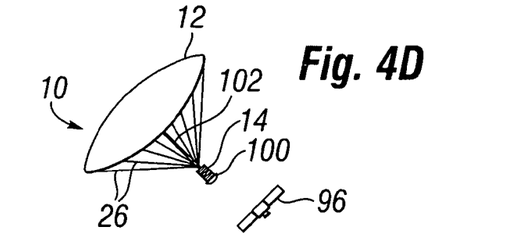

As depicted in FIG. 4C, the airfoil cover 92 can be jettisoned, releasing the airfoil 12 to inflate, which could be accomplished (partially or completely) using the residual helium left behind during earlier preparation of the airfoil 12 on Earth. As the 12 airfoil inflates, the canopy lines 26 will extend outward and away from the helium inflation tube 102. Further airfoil inflation can be achieved by opening valves to permit helium from tanks (which could be positioned, e.g., on the base unit 14 and/or on the spacecraft assembly 96) to flow up the helium inflation tube 102 and into the airfoil 12. As (or after) the airfoil 12 is expanded, the spacecraft assembly 96 and/or one or more depleted helium tanks can be jettisoned as depicted in FIG. 4D, lightening the remaining mass supported by the airfoil and substantially easing the load on the airfoil 12 during the rest of the atmospheric entry.

Note that the spacecraft assembly 96 can be jettisoned at various times, including after orbital insertion but before atmospheric reentry. For example, a spacecraft assembly according to the invention could include an operational satellite which separates from the aircraft and other payload components upon orbital insertion and then continues to orbit the planet as an operational satellite. The spacecraft assembly could also include other devices, including remote landers, etc., which are landed on the Martian surface and/or otherwise activated upon separation from the aircraft and/or other payload components.

In further embodiments of the invention, orbital insertion is achieved and/or assisted by the use of a ballute, which are known in the art. The ballute could be used in addition to, or in lieu of, the orbital insertion rocket 98 from FIGS. 4A-4D. As the payload approaches Mars, the ballute is deployed to provide initial aerobraking against the Martian atmosphere in order to transition the payload into a Martian orbit. The ballute is then jettisoned, and the airfoil is then deployed as depicted previously in FIG. 4C.

Depending on the particular application, the inflated airfoil itself may be used for aerobraking. For example, the airfoil could be inflated well before reaching the Martian atmosphere, with the inflated airfoil effectively serving as a ballute for aerobraking for orbital insertion. The inflated airfoil could thus assist, or even eliminating the need for, a separate ballute and/or rocket.

The airfoil 12 can be inflated with helium from tanks on the base unit 14, and/or can be inflated using helium pumped into the airfoil 12 during assembly on Earth. Because of the large atmospheric pressure difference between Earth and Mars, a relatively small amount of helium injected into the airfoil 12 at sea level on Earth would still permit the airfoil 12 to be compressed and/or folded for launch and delivery to Mars, with the airfoil cover 92 serving to restrain the airfoil 12 to prevent its expansion from the residual helium therewithin. When the airfoil cover 92 is removed, the airfoil 12 would at least partially expand from the residual helium. If needed, additional helium could be provided via the helium inflation tube 102 by the tanks on the base unit 14.

Assembling an aircraft with residual helium in the envelope could include providing the airfoil envelope, flushing the airfoil envelope with helium (or other lifting gas) to remove all Earth air and other contaminants from the airfoil envelope while also leaving behind a small amount of residual helium, and then sealing off the envelope to prevent the unwanted reintroduction of air or other contaminants. The residual helium can serve to help re-inflate the balloon at a later time (e.g., upon delivery to Mars or another destination), and also serve to sanitize (by cutting off the oxygen supply) and prevent the re-introduction of contaminants. The envelope could also be physically restrained in its deflated condition in order to prevent its re-inflating with outside air and/or other contaminants. The envelope with residual helium therein could then be prepared for launch to Mars, as discussed previously.

Figures 4E, 4F:
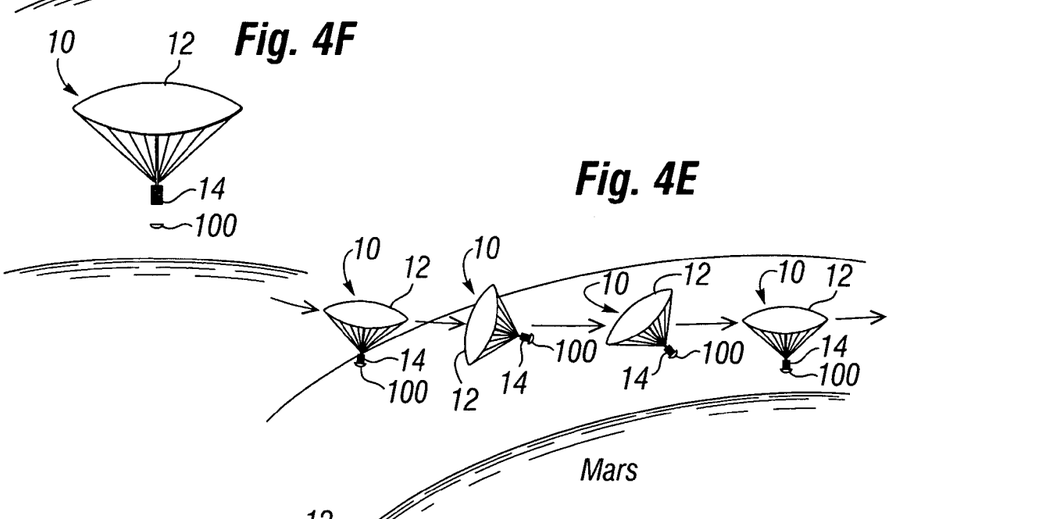

As depicted in FIG. 4E, as the aircraft 10 enters the Martian atmosphere and the airfoil 12 is inflated, the heat shield 100 serves to protect the aircraft 10 from the heat of reentry. The aircraft 10 will assume a "payload-down" configuration as it initially enters the Martian atmosphere, with the base unit 14 positioned below the airfoil 12 with respect to the direction of travel. The deceleration energy imparted during a high-speed Mars atmospheric entry may generally cause the inflated airfoil 12 to stay in the thinner upper portions of the Martian atmosphere until the aircraft speed has dropped to the point where the aircraft 10 can start an eventual glide toward the Martian surface.

While a traditional round parachute would head directly into the denser lower portions of the Martian atmosphere, the inflatable airfoil 12 will be nearly flat to the oncoming air during atmospheric entry, with the base unit 14 swinging forward due to atmospheric entry deceleration forces, thus forcing the now-inflated airfoil 12 essentially into a stall configuration.

An aircraft with inflatable airfoil according to the invention could be used in combination with a traditional re-entry parachute (not shown) for re-entry. The traditional re-entry parachute could provide all re-entry slowdown, or just initial slowdown through the atmosphere (for example, slowing down to sub-sonic speeds), with the inflatable airfoil deployed after the initial slowdown has been achieved. The inflatable airfoil could be deployed as or just after the traditional re-entry parachute is detached from the aircraft, with the inflatable airfoil then providing any remaining slowdown necessary for re-entry.

The aircraft will act as a pendulum in flight, with the backward and forward motion of the base unit or other payload acting to adjust the angle of attack of the airfoil. The angle of attack of the airfoil can also be adjusted manually by, e.g., using control lines secured to various portions of the airfoil and leading back to the payload. In one example of such adjustment, as the aircraft enters the outer atmosphere, the rear control lines of the aircraft (i.e., the rearmost parachute cords leading from the base unit to the airfoil) could be let out slightly in order to permit the base unit or other payload to swing forward with respect to the airfoil. Such an adjustment of the rear control lines would cause the airfoil to at least partially "fly" (i.e., create lift) during entry into the atmosphere, increasing the vehicle speed but also slowing the descent so that the aircraft will remain higher in the atmosphere for a longer period before descending to its general deployment altitude.

As the aircraft descends into the atmosphere, additional helium or other gases may be injected as needed into the airfoil 12 to maintain airfoil shape as the outside air pressure increases during the descent. As the aircraft 10 continues to slow down during entry into the Martian atmosphere, the aircraft 10 will assume a more forward-directed configuration (as opposed to the earlier "payload-down" configuration), and the leading edge of the airfoil 12 be directed into the oncoming airflow and the airfoil 12 will begin to generate lift. The aircraft 10 will soon be flying in the Martin atmosphere.

Figure 4G:
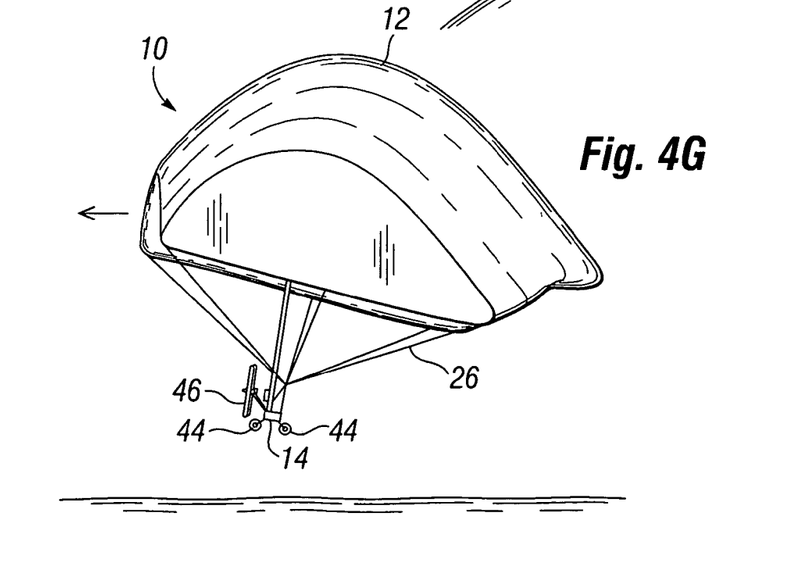

After the heat of reentry is dissipated, the heat shield 100, and possibly any depleted helium tanks, can be jettisoned to impact on the Martian surface, as depicted in FIG. 4F. The propellers 46, wheels 44, and other extendable and/or inflatable portions of the base unit 14 can then be extended and/or inflated, and the aircraft 10 can begin its flights in the Martian atmosphere to obtain views and other information on desired locations, as depicted in FIG. 4G.

The aircraft could be deployed from the ground (e.g., Martian surface), such as may occur if the aircraft were landed on the ground prior to the airfoil being inflated, or where the airfoil had become (partially or totally) deflated and is then reinflated using helium or other lifting gas from the base unit. A partially-deflated airfoil may force a landing when cooled at night due to the higher density of the cooled helium in the airfoil, and then relaunch in the morning as the sun warms and expands the remaining helium.

Figure 5A:
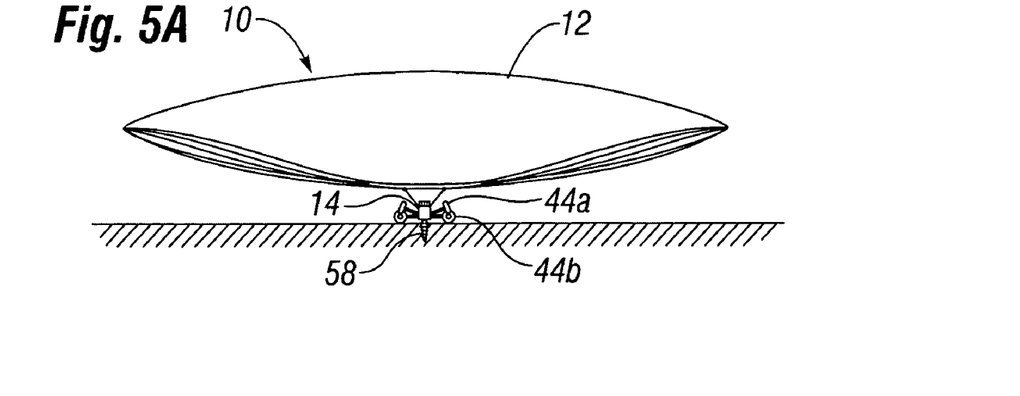
FIGS. 5A and 5B depict front and side views, respectively, of an aircraft anchored to the planet surface using an anchor drill according to an embodiment of the invention.
Figure 5B:
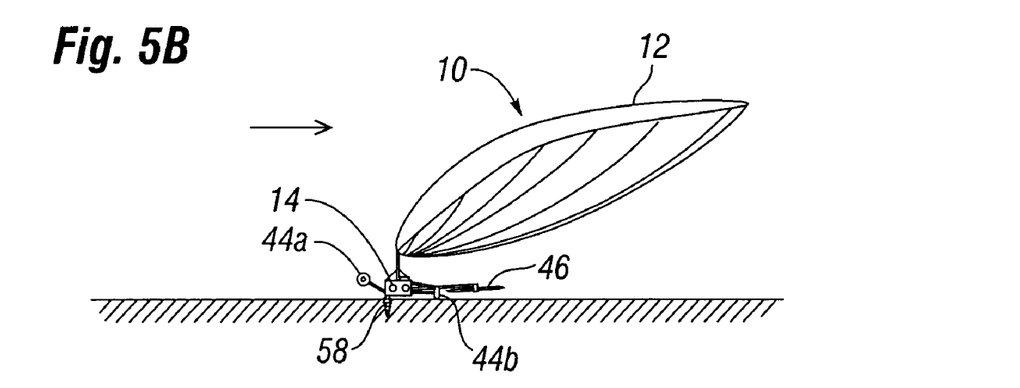

As depicted in FIGS. 5A-5B, when it is desired to secure the aircraft 10 to the ground, the anchor drill 58 can be driven into the surface. The propellers 46 can be rotated to be parallel to the surface and oncoming wind. The front wheels 44a can be rotated up and off the surface, with the rear wheels 44b rotated by 90 degrees to permit the aircraft to rotate about the anchor drill 58 so that the aircraft 10 can always face into the wind direction 104. Note that the drill 58 may be used for anchoring and/or scientific purposes, including drilling into the Martian surface to access subsurface geological deposits (e.g., water, etc.). The drill assembly may include sensors configured to monitor characteristics of such deposits.

An aircraft according to the invention could fly over the entirety of the Martian surface, including low altitudes and high altitudes. Due to the large wing area and static lift, the aircraft 10 will have significant lift to soar high along cliffs and volcanoes and previously unreachable areas. Areas with significant vertical relief, such as the side-walls of Valles Marineris or the flanks of Olympus Mons, may provide uplift in the presence of a head-wind, thus enabling the aircraft to reach greater heights in relatively thin air. Lower elevation and colder latitudes, such as ice deposits in northern craters and the polar ice caps, have denser air, with lift dominated by relative buoyancy as opposed to aerodynamics, thus permitting the aircraft to maneuver more slowly.

Figure 6:
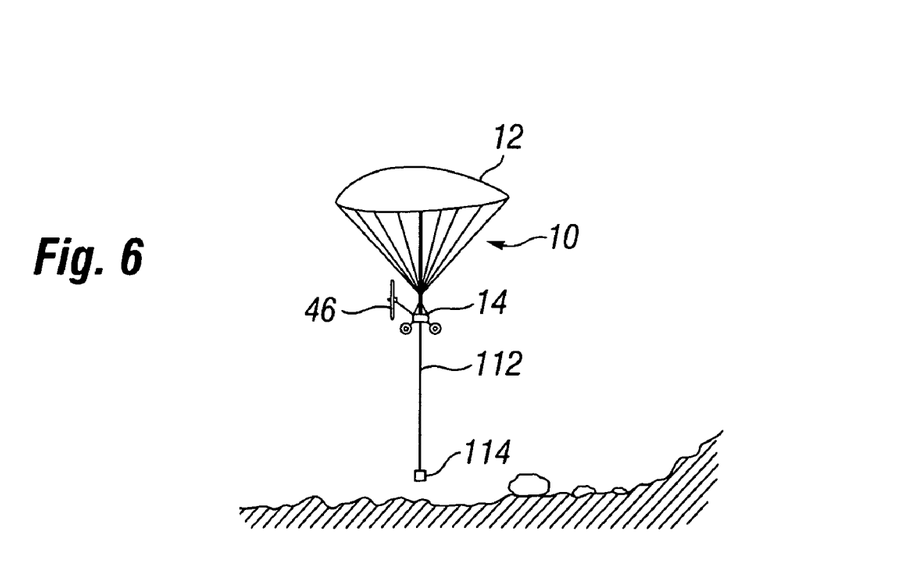
FIG. 6 depicts a side view of an aircraft used to deploy a payload onto the planet surface according to an embodiment of the invention.

The aircraft 10 in a buoyant mode with propellers 46 stabilizing its position could lower and/or raise various payloads 110, including scientific experiments, marsupial robots, or even the entire base unit 14, onto the Martian surface via a tether line 112 driven by an onboard winch (not shown), as depicted in FIG. 6. The payloads could be land sensors, which could be deployed at one or more locations across the Martian surface to monitor various planetary characteristics. For example, tan aircraft according to the invention could deploy multiple payloads in the form of seismographs at various positions on the planet's surface to form an array, with the array of seismographs configured to monitor seismic activity and coordinate (via triangulation, etc.) their data collection in order to develop models of the subsurface characteristics (including planetary core, etc.) of the planet.

A marsupial robot, such as a science rover, could also be the payload 100 lowered to and/or recovered from the surface by the aircraft 10. Such marsupial robots could be deployed for access to hard-to-reach areas. The aircraft 10 could deploy such a marsupial robot or robots repeatedly with an onboard winch, tether, and end effector (or "box") configured to release and/or capture the rover. The marsupial rover may remain tethered during its deployment, making retrieval by the aircraft relatively easy by simply winching the rover back onboard. The marsupial rover could also be untethered after deployment so it can freely traverse the surface. To retrieve a marsupial rover, the airship could home in the signal from the rover, and lower an end effector at the tether end. The end effector will attach to the rover, and the rover can then be lifted using the winch to rewind the tether line and/or by lifting the aircraft 10 higher into the atmosphere.

The aircraft 10 could also vary its buoyancy (using the ballonets, etc.) and land at selected locations for extensive scientific research onsite. When finished at one site, the aircraft 10 could then increase its buoyancy and take off to fly to another site. The aircraft 10 could also lower sensors into lower portions of the atmosphere (but without landing the sensors onto the surface) for scientific purposes, such as sampling of atmospheric conditions, imaging, etc. in the areas below the aircraft 10.

In a further embodiment of the invention, which may be applicable for high-altitude applications on Earth, the helium or other lifting gas is included within expandable balloons positioned within the larger envelope. The larger envelope is pumped or otherwise provided with air which, when combined with the helium in the expandable balloons therein, maintains the envelope in the desired shape (e.g., airfoil shape). The outside air can also be pumped into the envelope to create pressure to compress the expandable helium balloons, thus decreasing the overall buoyancy of the device. Releasing some outside air from the envelope can then increase the buoyancy, permitting the device to rise using static lift. Active lift (e.g., powered flight) can also be used to fly the device, depending on the particular application. As the device ascends to higher altitudes, the helium balloons will expand within the envelope, and the previously-added air can be released from the envelope to maintain constant pressure and shape of the envelope. At higher altitudes, the envelope will essentially be filled almost entirely by the helium-filled balloons inside. To descend, air can again be pumped into the envelope to compress the helium bags and decrease buoyancy. As the device descends into denser atmosphere, additional air can be pumped into the device to further compress the helium balloons and/or maintain the desired shape of the device.

While the invention has been described with reference to particular embodiments, it will be understood that various changes and additional variations may be made and equivalents may be substituted for elements thereof without departing from the scope of the invention or the inventive concept thereof. In addition, many modifications may be made to adapt a particular situation or device to the teachings of the invention without departing from the essential scope thereof. For example, while the invention has been discussed with respect to a mission to Mars, the aircraft could be used in various other applications, including Earth as well as other planets and moons. Lifting gases other than helium (e.g., hydrogen) could also be used. Therefore, it is intended that the invention not be limited to the particular embodiments disclosed herein, but that the invention will include all embodiments falling within the scope of the appended claims.

What is claimed is:
1. A method of preparing a device for delivery from Earth to a planetary body having an atmosphere, comprising:
providing a base unit, wherein the base unit comprises solar panels, batteries, and sensors;
providing an inflatable airfoil configured to form a lifting body when inflated, wherein the lifting body is configured to provide active lift when in forward motion through an atmosphere of a planetary body other than Earth and also to provide static lift in the atmosphere of the planetary body;

flushing the inflatable airfoil with a lifting gas to remove Earth air and other contaminants from the inflatable airfoil;

restraining the inflatable airfoil in a collapsed configuration;

securing the inflatable airfoil to the base unit to thereby form an aircraft.

2. The method of claim 1, wherein the lifting gas is helium.

3. The method of claim 1, wherein the inflatable airfoil comprises a plurality of individual cells.

4. The method of claim 1, wherein the method further comprises:
providing one or more canisters containing lifting gas; and
connecting the one or more canisters containing lifting gas to the inflatable airfoil so as to selectively provide lifting gas to the inflatable airfoil.

5. The method of claim 1, further comprising;
launching the aircraft from the Earth to the planetary body.

6. The method of claim 1, wherein the base unit comprises one or more scientific sensors.

7. The method of claim 1, further comprising:
providing a spacecraft; and
securing the spacecraft to the base unit.

8. A method of preparing a device for delivery from Earth to a planetary body having an atmosphere, comprising:
providing a base unit, wherein the base unit comprises one or more canisters containing lifting gas; and
providing an inflatable airfoil configured to form a lifting body when inflated, wherein the inflatable airfoil comprises a plurality of individual cells;
flushing the inflatable airfoil with lifting gas to remove Earth air and other contaminants from the inflatable airfoil;
restraining the inflatable airfoil in a collapsed configuration; and
securing the inflatable airfoil to the base unit to thereby form an aircraft, including connecting the one or more canisters containing lifting gas to the inflatable airfoil so as to selectively provide lifting gas to the inflatable airfoil.

9. The method of claim 8, wherein the lifting gas is helium.

10. The method of claim 8, further comprising;
securing the aircraft to an orbital insertion rocket configured to provide thrust to place the aircraft into orbit around the planetary body from an Earth-to-planetary-body trajectory;
positioning the aircraft on a launch vehicle configured to launch the aircraft into the Earth-to-planetary-body trajectory;
launching the aircraft into the Earth-to-planetary-body trajectory.

11. The method of claim 8, wherein the base unit comprises an anchoring drill configured to drill into the surface of the planetary body to secure the aircraft thereto while permitting the base unit to rotate in a 360 degree arc about the anchoring drill.

12. The method of claim 8, wherein the inflatable airfoil comprises a leading edge and a trailing edge, wherein the inflatable cells are generally elongated and extend lengthwise in a direction from the leading edge to the trailing edge of the inflatable airfoil, wherein the inflatable airfoil forms an airfoil shape when the cells are inflated, with the airfoil shape configured to provide lift when the inflatable airfoil is in forward flight.

13. The method of claim 12, wherein the inflatable airfoil comprises a ballonet positioned within the inflatable airfoil, the ballonet configured to receive outside air.

14. The method of claim 12, wherein the airfoil shape has a length and a width, and the length is greater than the width.

15. The aircraft of claim 12, wherein the airfoil shape has a generally flat bottom section.

* * * * *